US011508255B2

(12) United States Patent
Bicanic et al.

(10) Patent No.: US 11,508,255 B2
(45) Date of Patent: Nov. 22, 2022

(54) METHODS, SYSTEMS, APPARATUSES AND DEVICES FOR FACILITATING PROVISIONING OF A VIRTUAL EXPERIENCE

(71) Applicant: RED SIX AEROSPACE INC., Santa Monica, CA (US)

(72) Inventors: Nick Vladimir Bicanic, Venice, CA (US); Daniel Augustine Robinson, Marina Del Rey, CA (US); Glenn Thomas Snyder, Venice, CA (US)

(73) Assignee: RED SIX AEROSPACE INC., Santa Monica, CA (US)

( * ) Notice: Subject to any disclaimer, the term of this patent is extended or adjusted under 35 U.S.C. 154(b) by 0 days.

(21) Appl. No.: 16/243,026

(22) Filed: Jan. 8, 2019

(65) Prior Publication Data
US 2019/0333404 A1    Oct. 31, 2019

Related U.S. Application Data

(60) Provisional application No. 62/663,883, filed on Apr. 27, 2018.

(51) Int. Cl.
*G09B 9/08* (2006.01)
*G06F 3/01* (2006.01)
(Continued)

(52) U.S. Cl.
CPC .............. *G09B 9/08* (2013.01); *B64D 45/00* (2013.01); *G06F 3/013* (2013.01); *G06F 3/14* (2013.01);
(Continued)

(58) Field of Classification Search
CPC . G06F 3/14; G06F 3/013; G06F 3/147; G06F 3/011; G09B 9/08; G09B 9/16;
(Continued)

(56) References Cited

U.S. PATENT DOCUMENTS 5,838,262 A    11/1998 Kershner
6,826,458 B2   11/2004 Horvath
(Continued)

OTHER PUBLICATIONS

Collin Krum, Ordinary Pilots Are Closer to Getting Fighter Jet-Like Augmented Reality Displays, Aug. 31, 2015, Jalopnik (https://jalopnik.com/general-aviation-pilots-closer-to-getting-tighter-jet-I-1722914390).
(Continued)

*Primary Examiner* — Michael Le
(74) *Attorney, Agent, or Firm* — FisherBroyles LLP

(57) ABSTRACT

A system for facilitating provisioning of a virtual experience is disclosed. The system may include a communication device configured for receiving at least one first sensor data from at least one first sensor of a first vehicle and at least one second sensor data from at least one second sensor of a second vehicle. Further, the communication device may be configured for transmitting at least one first presentation data to at least one first presentation device and at least one second presentation data to at least one second presentation device. Further, the at least one presentation device may be configured for presenting the at least one first presentation data and the at least one second presentation data. Further, the system may include a processing device configured for generating the at least one first presentation data and the at least one second presentation data.

9 Claims, 9 Drawing Sheets

(51) Int. Cl.
  *G06F 3/14* (2006.01)
  *B64D 45/00* (2006.01)
  G02B 27/01 (2006.01)
  B64F 5/60 (2017.01)
(52) U.S. Cl.
  CPC ............ *B64F 5/60* (2017.01); *G02B 27/0172* (2013.01); *G02B 2027/014* (2013.01)
(58) Field of Classification Search
  CPC .............. G09B 9/24; G02B 2027/014; G02B 27/0172; B64D 45/00; B64D 43/00; B64F 5/60; G09G 2380/12
  See application file for complete search history.

(56) References Cited

U.S. PATENT DOCUMENTS

| | | | |
|---|---|---|---|
| 8,463,463 | B1 | 6/2013 | Feldmann |
| 9,099,009 | B2 * | 8/2015 | Sowadski ............... G09B 9/02 |
| 10,025,096 | B2 | 7/2018 | Yoon |
| 10,585,471 | B2 | 3/2020 | Reichow |
| 10,713,960 | B1 | 7/2020 | Ziarnick |
| 10,884,525 | B1 | 1/2021 | Vonsik |
| 10,977,493 | B2 | 4/2021 | Speasl |
| 10,996,473 | B2 | 5/2021 | Yang |
| 2002/0053983 | A1 | 5/2002 | Chamas |
| 2003/0025714 | A1 | 2/2003 | Ebersole |
| 2005/0231419 | A1 | 10/2005 | Mitchell |
| 2006/0146048 | A1 * | 7/2006 | Wright .................... G01C 23/00 345/419 |
| 2006/0178758 | A1 | 8/2006 | Koriat |
| 2007/0005199 | A1 | 1/2007 | He |
| 2008/0319647 | A1 * | 12/2008 | Dehn .................. G08G 5/0034 701/533 |
| 2010/0096491 | A1 * | 4/2010 | Whitelaw ................ B64G 1/00 244/15 |
| 2010/0125412 | A1 | 5/2010 | Suddreth |
| 2010/0283635 | A1 * | 11/2010 | Brinkman ............ G08G 5/0078 340/961 |
| 2011/0183301 | A1 | 7/2011 | Turner |
| 2012/0156653 | A1 | 6/2012 | Wokurka |
| 2012/0176497 | A1 * | 7/2012 | Shadmi .................. G01C 21/00 348/144 |
| 2012/0303252 | A1 | 11/2012 | Schwinn |
| 2013/0038510 | A1 | 2/2013 | Brin |
| 2013/0050070 | A1 | 2/2013 | Lewis |
| 2013/0162632 | A1 | 6/2013 | Varga |
| 2013/0280678 | A1 | 10/2013 | Towers |
| 2014/0080099 | A1 | 3/2014 | Sowadski |
| 2014/0127655 | A1 | 5/2014 | Taylor |
| 2014/0306866 | A1 | 10/2014 | Miller |
| 2015/0187224 | A1 | 7/2015 | Moncrief |
| 2015/0234455 | A1 | 8/2015 | Lavalle |
| 2015/0294505 | A1 | 10/2015 | Atsmon |
| 2016/0019808 | A1 | 1/2016 | Bezerra |
| 2016/0027336 | A1 | 1/2016 | Towers |
| 2016/0165409 | A1 * | 6/2016 | Bulut ................. G06Q 30/0261 715/734 |
| 2016/0188857 | A1 | 6/2016 | Semba |
| 2016/0195923 | A1 * | 7/2016 | Nauseef .................... A47C 7/72 297/344.21 |
| 2017/0030735 | A1 | 2/2017 | Mohideen |
| 2017/0064157 | A1 | 3/2017 | Lawrence |
| 2017/0069214 | A1 * | 3/2017 | Dupray ................ G08G 5/0013 |
| 2017/0109562 | A1 | 4/2017 | Shroff |
| 2017/0139205 | A1 | 5/2017 | Lee |
| 2017/0186240 | A1 | 6/2017 | Alaniz |
| 2017/0262052 | A1 | 9/2017 | Richmond |
| 2017/0308157 | A1 | 10/2017 | Tsuda |
| 2018/0096532 | A1 | 4/2018 | Srivastav |
| 2018/0130260 | A1 * | 5/2018 | Schmirler .......... G06Q 10/0633 |
| 2018/0155052 | A1 * | 6/2018 | Lacroix ................ G08G 5/0082 |
| 2018/0190095 | A1 | 7/2018 | Leegate |
| 2018/0253856 | A1 | 9/2018 | Price |
| 2018/0272231 | A1 | 9/2018 | Katoh |
| 2019/0035258 | A1 * | 1/2019 | Zhang ................... H04W 4/024 |
| 2019/0212158 | A1 | 7/2019 | Gordon |
| 2019/0215671 | A1 * | 7/2019 | Takii ....................... H04L 51/38 |
| 2019/0228590 | A1 * | 7/2019 | Kaifosh ................. G06N 20/10 |
| 2019/0317718 | A1 * | 10/2019 | George ................... G06F 3/012 |
| 2020/0151958 | A1 | 5/2020 | Livneh |

OTHER PUBLICATIONS

Written Opinion of the International Searching Authority dated Dec. 17, 2021, in International Application No. PCT/US2021/057357.
International Search Report dated Dec. 17, 2021, in International Application No. PCT/US2021/057357.
Michael William Gillen; A Study Evaluating if Targeted Training for Startle Effect can Improve Pilot Reactions in Handling U Unexpected Situations in a Flight Simulator; The University of North Dakota. ProQuest Dissertations Publishing, Dec. 1, 2016 (Year: 2016).

\* cited by examiner

1

METHODS, SYSTEMS, APPARATUSES AND DEVICES FOR FACILITATING PROVISIONING OF A VIRTUAL EXPERIENCE

TECHNICAL FIELD

Generally, the present disclosure relates to the field of data processing. More specifically, the present disclosure relates to methods, systems, apparatuses and devices for facilitating provisioning of a virtual experience.

BACKGROUND

Technology is often used for various types of training. This may include using simulators. For combat training, pilots are provided with simulators that simulate the real aircraft. NATO has developed Live, Virtual, Constructive (LVC) model as the next generation of hybrid training solutions to prepare the military for the battlefield of the future. Live refers to simulation involving real people operating real systems. Military training events using real equipment are live simulations. They are considered simulations because they are not conducted against a live enemy. Virtual refers to real people in simulated systems, on the ground. Virtual simulations inject a Human-in-the-Loop into a central role by exercising motor control skills (e.g., flying jet), decision-making skills, or communication skills. Further, constructive refers to computer-generated targets. Constructive simulation involves simulated people operating simulated systems. Real people stimulate (make inputs to) such simulations, but are not involved in determining the outcomes. A constructive simulation is a computer program.

However, the existing systems allow pilots to physically only see live assets. There are no visuals for constructive and virtual assets. Therefore, the existing systems provide very limited training value.

Further, the existing systems do not allow pilots to look out of the cockpit window and see a real-looking airplane in the sky. Instead, the existing systems use instruments or flight computers that may display an enemy—but it's not an enemy that the pilots can actually see. Therefore, they do not allow for within visual range maneuvering. Further, the existing systems are unable to provide high-quality visual content to pilots with high accuracy.

Therefore, there is a need for improved methods, systems, apparatuses and devices for facilitating provisioning of a virtual experience that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a system for facilitating provisioning of a virtual experience is disclosed. The system may include a communication device configured for receiving at least one first sensor data corresponding to at least one first sensor associated with a first vehicle. Further, the at least one first sensor may be communicatively coupled to a first transmitter configured for transmitting the at least one first sensor data over a first communication channel. Further, the communication device may be configured for receiving at least one second sensor data corresponding to at least one second sensor associated with a second vehicle. Further, the at least one second sensor may be communicatively coupled to a second transmitter configured for transmitting the at least one second sensor data over a second communication channel. Further, the communication device may be configured for transmitting at least one first presentation data to at least one first presentation device associated with the first vehicle. Further, the at least one first presentation device may include a first receiver configured for receiving the at least one first presentation data over the first communication channel. Further, the at least one presentation device may be configured for presenting the at least one first presentation data. Further, the communication device may be configured for transmitting at least one second presentation data to at least one second presentation device associated with the second vehicle. Further, the at least one second presentation device may include a second receiver configured for receiving the at least one second presentation data over the second communication channel. Further, the at least one presentation device may be configured for presenting the at least one second presentation data. Further, the system may include a processing device configured for generating the at least one first presentation data based on the at least one second sensor data. Further, the processing device may be configured for generating the at least one second presentation data based on the at least one first sensor data. Further, the system may include a storage device configured for storing each of the at least one first presentation data and the at least one second presentation data.

According to some embodiments, a method of facilitating provisioning of a virtual experience is also disclosed. The method may include receiving, using a communication device, at least one first sensor data corresponding to at least one first sensor associated with a first vehicle. Further, the at least one first sensor may be communicatively coupled to a first transmitter configured for transmitting the at least one first sensor data over a first communication channel; receiving, using the communication device, at least one second sensor data corresponding to at least one second sensor associated with a second vehicle. Further, the at least one second sensor may be communicatively coupled to a second transmitter configured for transmitting the at least one second sensor data over a second communication channel; transmitting, using the communication device, at least one first presentation data to at least one first presentation device associated with the first vehicle. Further, the at least one first presentation device may include a first receiver configured for receiving the at least one first presentation data over the first communication channel. Further, the at least one presentation device may be configured for presenting the at least one first presentation data; transmitting, using the communication device, at least one second presentation data to at least one second presentation device associated with the second vehicle. Further, the at least one second presentation device may include a second receiver configured for receiving the at least one second presentation data over the second communication channel. Further, the at least one presentation device may be configured for presenting the at least one second presentation data. Further, the method may include generating, using a processing device, the at least one first presentation data based on the at least one second sensor data. Further, the method may include generating, using the processing device, the at least one second presentation data based on the at least one first sensor data. Further, the method may include storing, using a storage device, each of the at least one first presentation data and the at least one second presentation data.

According to some embodiment, an apparatus for facilitating provisioning of a virtual experience is also disclosed. The apparatus may include at least one first sensor configured for sensing at least one first sensor data associated with a first vehicle. Further, the apparatus may include a first transmitter configured to be communicatively coupled to the at least first sensor. Further, the first transmitter may be further configured for transmitting the at least one first sensor data to a communication device of a system over a first communication channel. Further, the apparatus may include a first receiver configured for receiving the at least one first presentation data from the communication device over the first communication channel. Further, the at least one first presentation device may be further configured for presenting the at last one first presentation data. Further, the communication device may be further configured for receiving at least one second sensor data corresponding to at least one second sensor associated with a second vehicle. Further, the at least one second sensor may be communicatively coupled to a second transmitter configured for transmitting the at least one second sensor data over a second communication channel. Further, the system further may include a processing device communicatively coupled to the communication device. Further, the processing device may be configured for generating the at least one first presentation data based on the at least one second sensor data. Further, the apparatus may include at least one first presentation device configured to be communicatively coupled to the first receiver.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Figure 1:
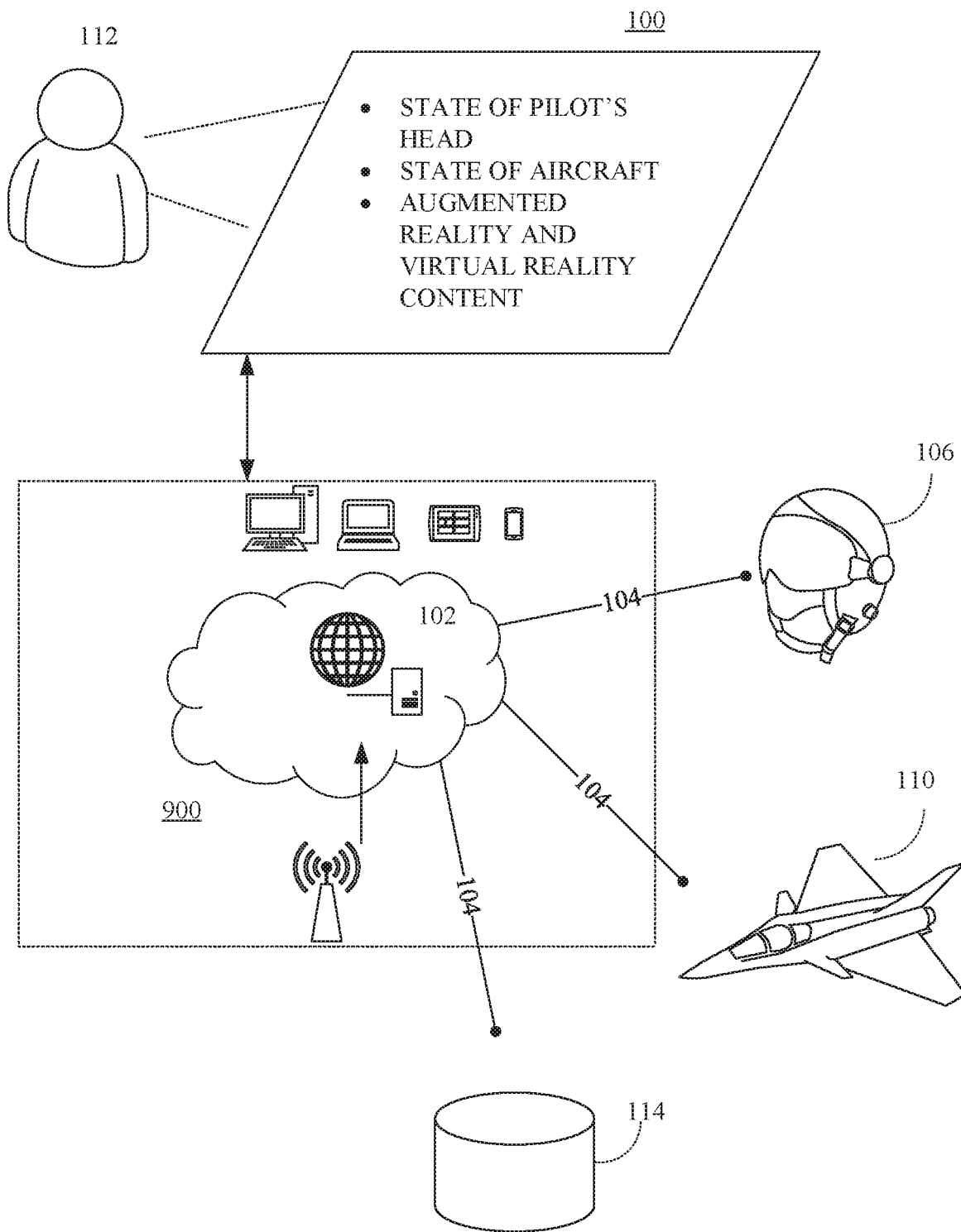
FIG. 1 is an illustration of a platform consistent with various embodiments of the present disclosure.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of provisioning of a virtual experience, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine-readable secret data (e.g. encryption key, decryption key, barcodes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between the performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to the performance of the one or more steps. For example, the historical data may be collected, using the storage device, from a plurality of instances of the performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data there between corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods and systems to allow real pilots in real aircraft use augmented and virtual reality for combat training.

According to some embodiments, a platform to allow real pilots in real aircraft using augmented and virtual reality to meet in a virtual piece of airspace is disclosed. The platform may include a centralized server which may communicate with augmented reality display devices for pilots, and sensor systems of aircraft. Further, the centralized server may include one or more servers; for example, a master server and one or more local servers. The one or more servers may be stationed on one or more of the aircraft, the ground and a satellite orbiting the earth. All communication between the augmented reality display device and the sensor system with the platform may be carried via radio waves. The augmented reality display device may display content to a pilot flying the aircraft. The sensor system of the aircraft may include one or more internal sensors to track and localize the pilot's head within the cockpit of the aircraft. Further, the sensor system of the aircraft may include one or more external sensors to track the operational state (e.g. location, speed, a direction of travel, etc.) of the aircraft. Further, Coupled Fusion Tracking (CFT) may be employed to combine the data received from the one or more internal sensors and the one or more external sensors to provide a highly usable augmented reality solution in a fast-moving environment.

According to some aspects, a method to allow real pilots in real aircraft using augmented and virtual reality to meet in a virtual airspace is disclosed. The method may include creating the virtual airspace in an augmented and virtual reality environment. Further, the method may include a real pilot in a real aircraft joining the virtual airspace via their augmented and virtual reality equipment. The real aircraft may be flying in the real world. Further, the method may include providing augmented and virtual reality content to the real pilot via their augmented and virtual reality equipment. Further, the method may include tracking the real pilot and the real aircraft. This may include tracking the position and orientation of the pilot's head within the cockpit of the aircraft using the one or more internal sensors. Further, this may include tracking the operational state (e.g. location, speed, a direction of travel, etc.) of the aircraft in the virtual airspace using the one or more external sensors. Moreover, the method may include continuously updating the augmented and virtual reality content shown to the real pilot flying the real aircraft based on the tracking the real pilot and the real aircraft.

According to some embodiments, an airborne flight training system is disclosed. The system may be referred to as Airborne Tactical Augmented Reality Integration (ATARI). The system may allow real pilots in real aircraft using augmented and virtual reality to meet in a virtual piece of airspace and conduct live flight and combat training in either an augmented or virtual space. Further, the system may be configured to accurately display a high fidelity image to pilots in flight using an augmented reality device (such as a flight helmet, or a special goggles or the cockpit glass). Further, the system may use external trackers (for outside-in tracking) inside the cockpit to localize the pilot's head within the airframe. Further, the system may use external sensors in the aircraft itself to track the aircraft. Further, the system may use Coupled Fusion Tracking (CFT) to combine two pieces of information including the state of the pilot's head and the aircraft to provide highly usable augmented reality solution in a fast-moving environment.

According to some embodiments, a method and a system is disclosed for monitoring operational state (e.g. location, speed, the direction of travel, etc.) of a first vehicle and accordingly providing an image of the first vehicle in an augmented reality view visible from within a second vehicle (physically distant from the first vehicle) in order to create an impression of the first vehicle being in the vicinity of the second vehicle. Further, the method and system may provide an augmented reality view to a user of a vehicle (E.g. aircraft) in order to facilitate training for combat. Accordingly, the method and system may provide a multi-player video game where participants play the video game while flying real aircraft in the real world.

In further embodiments, the disclosed system may support all domains including, Sea, Air, Land, Space, and Cyber, and may also include all vehicles (other than aircraft). Further, the system may support various types of training (other than combat training).

FIG. 1 is an illustration of an online platform 100 consistent with various embodiments of the present disclosure. By way of non-limiting example, the online platform 100 to facilitate provisioning of a virtual experience may be hosted on a centralized server 102, such as, for example, a cloud computing service. The centralized server 102 may communicate with other network entities, such as, for example, an augmented and virtual reality display device 106, a sensor system 110 of an aircraft, database 114 (such as 3D model database over a communication network 104, such as, but not limited to, the Internet. Further, users of the online platform 100 may include relevant parties such as, but not limited to, trainees, trainers, pilots, administrators, and so on.

Accordingly, in some instances, the augmented and virtual reality display device 106 operated by a pilot (a user 112) may be in communication with the platform 100. Further, the sensor system 110 of an aircraft may be in communication with the platform 100. All communication between the augmented and virtual reality display device 106 and the sensor system 110 with the platform 100 may be carried via radio waves. For example, Aircraft Communications Addressing and Reporting System (ACARS) may be used for communication between the augmented and virtual reality display device 106 or the sensor system 110, and the platform 100.

Further, the centralized server 102 may include one or more servers; for example, a master server and one or more local servers. The one or more servers may be stationed on one or more of the aircraft, the ground and a satellite orbiting the earth (such as Satcom and Iridium™ satellites). Further, the aircraft may include a Remote Artificial Intelligence Link (RAIL) for communication with the centralized server 102. Further, the AI-driven processing and the graphics generation may be performed on the centralized server 102.

The augmented and virtual reality display device 106 may display content to a pilot flying the aircraft. The augmented and virtual reality display device 106 may be one of a head-mounted display (HMD), Eyeglasses, head-up display (HUD), smart contact lenses, Virtual retinal display, EyeTap, and cockpit glass. In some embodiments, the augmented and virtual reality display device 106 may be integrated with a flight helmet of a pilot. Further, an Enhanced Visual Environment (EVE) may be configured to provide high fidelity/wide field of view content to the augmented and virtual reality display device 106.

The sensor system 110 of the aircraft may include one or more internal sensors to track and localize the pilot's head within the cockpit of the aircraft.

Further, the sensor system 110 of the aircraft may include one or more external sensors to track the position and orientation of the aircraft. Further, an Avionics Integration System may be configured to provides accurate six degrees of freedom positioning of aircraft. The six degrees of freedom include longitudinal (forward and backward thrust), vertical (aircraft moves upward and downward), lateral (aircraft moves from side to side), pitch (nose pitches up or down), roll (wings roll up or down) and yaw (nose moves from side to side).

Further, Coupled Fusion Tracking (CFT) may be employed to combine the data received from the one or more internal sensors and the one or more external sensors to provide a highly usable augmented reality solution in a fast-moving environment. Further, the CFT may integrate both virtual reality and augmented reality to provide robust augmented reality visuals within a dynamic environment. For example, the CFT may allow for drawing an accurate picture of an enemy aircraft in augmented and virtual reality display device 106 worn by a pilot.

A user 112, such as the one or more relevant parties, may access online platform 100 through a software application or browser. The software application may be embodied as, for example, but not be limited to, a website, a web application, a desktop application, and a mobile application compatible with a computing device 900.

Figure 2:
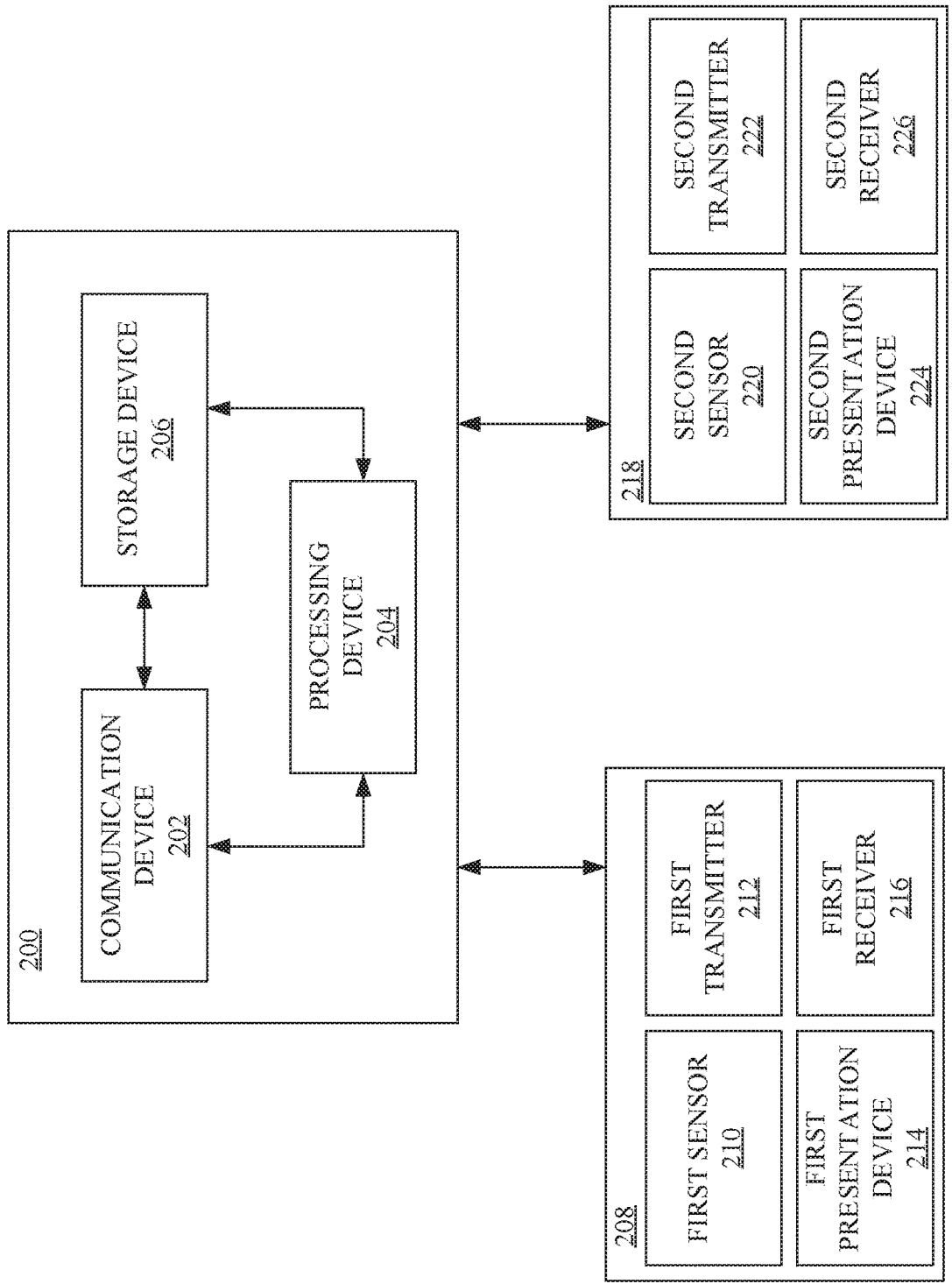
FIG. 2 is a block diagram of a system for facilitating provisioning of a virtual experience in accordance with some embodiments.

FIG. 2 is a block diagram of a system 200 for facilitating provisioning of a virtual experience in accordance with some embodiments. The system 200 may include a communication device 202, a processing device 204 and a storage device 206.

The communication device 202 may be configured for receiving at least one first sensor data corresponding to at least one first sensor 210 associated with a first vehicle 208. Further, the at least one first sensor 210 may be communicatively coupled to a first transmitter 212 configured for transmitting the at least one first sensor data over a first communication channel. In some embodiments, the first vehicle 208 may be a first aircraft. Further, the first user may be a first pilot.

Further, the communication device 202 may be configured for receiving at least one second sensor data corresponding to at least one second sensor 220 associated with a second vehicle 218. Further, the at least one second sensor 220 may be communicatively coupled to a second transmitter 222 configured for transmitting the at least one second sensor data over a second communication channel. In some embodiments, the second vehicle 218 may be a second aircraft. Further, the second user may be a second pilot.

In some embodiments, the at least one first sensor data may be received from a first On-Board-Diagnostics (OBD) system of the first vehicle 208, the at least one second sensor data may be received from a second On-Board-Diagnostics (OBD) system of the second vehicle 218.

Further, the communication device 202 may be configured for transmitting at least one first presentation data to at least one first presentation device 214 associated with the first vehicle 208. Further, the at least one first presentation device 214 may include a first receiver 216 configured for receiving the at least one first presentation data over the first communication channel. Further, the at least one presentation device may be configured for presenting the at least one first presentation data.

Further, the communication device 202 may be configured for transmitting at least one second presentation data to at least one second presentation device 224 associated with the second vehicle 218. Further, the at least one second presentation device 224 may include a second receiver 226 configured for receiving the at least one second presentation data over the second communication channel. Further, the at least one presentation device may be configured for presenting the at least one second presentation data.

Further, the processing device 204 may be configured for generating the at least one first presentation data based on the at least one second sensor data.

Further, the processing device 204 may be configured for generating the at least one second presentation data based on the at least one first sensor data.

Further, the storage device 206 may be configured for storing each of the at least one first presentation data and the at least one second presentation data.

In some embodiments, the at least one first sensor 210 may include one or more of a first orientation sensor, a first motion sensor, a first accelerometer, a first location sensor, a first speed sensor, a first vibration sensor, a first temperature sensor, a first light sensor and a first sound sensor. Further, the at least one second sensor 220 may include one or more of a second orientation sensor, a second motion sensor, a second accelerometer, a second location sensor, a second speed sensor, a second vibration sensor, a second temperature sensor, a second light sensor and a second sound sensor.

In some embodiments, the at least one first sensor 210 may be configured for sensing at least one first physical variable associated with the first vehicle 208. Further, the at least one second sensor 220 may be configured for sensing at least one second physical variable associated with the second vehicle. In further embodiments, the at least one first physical variable may include one or more of a first orientation, a first motion, a first acceleration, a first location, a first speed, a first vibration, a first temperature, a first light intensity and a first sound. Further, the at least one second physical variable may include one or more of a second orientation, a second motion, a second acceleration, a second location, a second speed, a second vibration, a second temperature, a second light intensity and a second sound.

In some embodiments, the at least one first sensor 210 may include a first environmental sensor configured for sensing a first environmental variable associated with the first vehicle 208. Further, the at least one second sensor 220 may include a second environmental sensor configured for sensing a second environmental variable associated with the second vehicle.

In some embodiments, the at least one first sensor 210 may include a first user sensor configured for sensing a first user variable associated with a first user of the first vehicle 208. Further, the at least one second sensor 220 may include a second user sensor configured for sensing a second user variable associated with a second user of the second vehicle 218.

In further embodiments, the first user variable may include a first user location and a first user orientation. Further, the second user variable may include a second user location and a second user orientation. Further, the first presentation device may include a first head mount display. Further, the second presentation device may include a second head mount display.

In further embodiments, the first head mount display may include a first user location sensor of the at least one first sensor 210 configured for sensing the first user location and a first user orientation sensor of the at least one first sensor 210 configured for sensing the first user orientation. The first head mount display is explained in further detail in conjunction with FIG. 3 below. Further, the second head mount display may include a second user location sensor of the at least one second sensor 220 configured for sensing the second user location, a second user orientation sensor of the at least one second sensor 220 configured for sensing the second user orientation.

In further embodiments, the first vehicle 208 may include a first user location sensor of the at least one first sensor 210 configured for sensing the first user location and a first user orientation sensor of the at least one first sensor 210 configured for sensing the first user orientation. Further, the second vehicle 218 may include a second user location sensor of the at least one second sensor 220 configured for sensing the second user location, a second user orientation sensor of the at least one second sensor 220 configured for sensing the second user orientation.

In further embodiments, the first user orientation sensor may include a first gaze sensor configured for sensing a first eye gaze of the first sensor. Further, the second user orientation sensor may include a second gaze sensor configured for sensing a second eye gaze of the second sensor.

In further embodiments, the first user location sensor may include a first proximity sensor configured for sensing the first user location in relation to the at least one first presentation device 214. Further, the second user location sensor may include a second proximity sensor configured for sensing the second user location in relation to the at least one second presentation device 224.

In some embodiments, the first head mount display may include a first see-through display device. Further, the second head mount display may include a second see-through display device.

In some embodiments, the first head mount display may include a first optical marker configured to facilitate determination of one or more of the first user location and the first user orientation. Further, the at least one first sensor 210 may include a first camera configured for capturing a first image of the first optical marker. Further, the at least one first sensor 210 may be communicatively coupled to a first processor associated with the vehicle. Further, the first processor may be configured for determining one or more of the first user location and the first user orientation based on analysis of the first image. Further, the second head mount display may include a second optical marker configured to facilitate determination of one or more of the second user location and the second user orientation. Further, the at least one second sensor 220 may include a second camera configured for capturing a second image of the second optical marker. Further, the at least one second sensor 220 may be communicatively coupled to a second processor associated with the vehicle. Further, the second processor may be configured for determining one or more of the second user location and the second user orientation based on analysis of the second image.

In some embodiments, the first presentation device may include a first see-through display device disposed in a first windshield of the first vehicle 208. Further, the second presentation device may include a second see-through display device disposed in a second windshield of the second vehicle 218.

In some embodiments, the first vehicle 208 may include a first watercraft, a first land vehicle, a first aircraft and a first amphibious vehicle. Further, the second vehicle 218 may include a second watercraft, a second land vehicle, a second aircraft and a second amphibious vehicle.

In some embodiments, the at least one first presentation data may include one or more of a first visual data, a first audio data and a first haptic data. Further, the at least one second presentation data may include one or more of a second visual data, a second audio data and a second haptic data.

In some embodiments, the at least one first presentation device 214 may include at least one environmental variable actuator configured for controlling at least one first environmental variable associated with the first vehicle 208 based on the first presentation data. Further, the at least one second presentation device 224 may include at least one environmental variable actuator configured for controlling at least one second environmental variable associated with the second vehicle 218 based on the second presentation data. In further embodiments, the at least one first environmental variable may include one or more of a first temperature level, a first humidity level, a first pressure level, a first oxygen level, a first ambient light, a first ambient sound, a first vibration level, a first turbulence, a first motion, a first speed, a first orientation and a first acceleration, the at least one second environmental variable may include one or more of a second temperature level, a second humidity level, a second pressure level, a second oxygen level, a second ambient light, a second ambient sound, a second vibration level, a second turbulence, a second motion, a second speed, a second orientation and a second acceleration.

In some embodiments, the first vehicle 208 may include each of the at least one first sensor 210 and the at least one first presentation device 214. Further, the second vehicle 218 may include each of the at least one second sensor 220 and the at least one second presentation device 224.

In some embodiments, the storage device 206 may be further configured for storing a first three-dimensional model corresponding to the first vehicle 208 and a second three-dimensional model corresponding to the second vehicle 218. Further, the generating of the first presentation data may be based further on the second three-dimensional model. Further, the generating of the second presentation data may be based further on the first three-dimensional model.

In some embodiments, the communication device 202 may be further configured for receiving an administrator command from an administrator device. Further, the generating of one or more of the first presentation data and the second presentation data may be based further on the administrator command. In further embodiments, the at least one first presentation model may include at least one first virtual object model corresponding to at least one first virtual object. Further, the at least one second presentation model may include at least one second virtual object model corresponding to at least one second virtual object. Further, the generating of the at least one first virtual object model may be independent of the at least one second sensor model. Further, the generating of the at least one second virtual object model may be independent of the at least one first sensor model. Further, the generating of one or more of the at least one first virtual object model and the at least one second virtual object model may be based on the administrator command. Further, the storage device 206 may be configured for storing the at least one first virtual object model and the at least one second virtual object model.

In further embodiments, the administrator command may include a virtual distance parameter. Further, the generating of each of the at least one first presentation data and the at least one second presentation data may be based on the virtual distance parameter.

In further embodiments, the at least one first sensor data may include at least one first proximity data corresponding to at least one first external real object in a vicinity of the first vehicle 208. Further, the at least one second sensor data may include at least one second proximity data corresponding to at least one second external real object in a vicinity of the second vehicle 218. Further, the generating of the at least one first presentation data may be based further on the at least one second proximity data. Further, the generating of the at least one second presentation data may be based further on the at least one first proximity data. In further embodiments, the at least one first external real object may include a first cloud, a first landscape feature, a first man-made structure and a first natural object. Further, the at least one second external real object may include a second cloud, a second landscape feature, a second man-made structure and a second natural object.

In some embodiments, the at least one first sensor data may include at least one first image data corresponding to at least one first external real object in a vicinity of the first vehicle 208. Further, the at least one second sensor data may include at least one second image data corresponding to at least one second external real object in a vicinity of the second vehicle 218. Further, the generating of the at least one first presentation data may be based further on the at least one second image data. Further, the generating of the at least one second presentation data may be based further on the at least one first image data.

In some embodiments, the communication device 202 may be further configured for transmitting a server authentication data to the first receiver 216. Further, the first receiver 216 may be communicatively coupled to first processor associated with the first presentation device. Further, the first processor may be communicatively coupled to a first memory device configured to store a first authentication data. Further, the first processor may be configured for performing a first server authentication based on the first authentication data and the server authentication data. Further, the first processor may be configured for controlling presentation of the at least one first presentation data on the at least one first presentation device 214 based on the first server authentication. Further, the communication device 202 may be configured for transmitting a server authentication data to the second receiver 226. Further, the second receiver 226 may be communicatively coupled to second processor associated with the second presentation device. Further, the second processor may be communicatively coupled to a second memory device configured to store a second authentication data. Further, the second processor may be configured for performing a second server authentication based on the second authentication data and the server authentication data. Further, the second processor may be configured for controlling presentation of the at least one second presentation data on the at least one second presentation device 224 based on the second server authentication. Further, the communication device 202 may be configured for receiving a first client authentication data from the first transmitter 212. Further, the storage device 206 may be configured for storing the first authentication data. Further, the communication device 202 may be configured for and receiving a second client authentication data from the second transmitter 222. Further, the storage device 206 may be configured for storing the second authentication data. Further, the processing device 204 may be further configured for performing a first client authentication based on the first client authentication data and the first authentication data. Further, the generating of the at least one second presentation data may be further based on the first client authentication. Further, the processing device 204 may be configured for performing a second client authentication based on the second client authentication data and the second authentication data. Further, the generating of the at least one first presentation data may be further based on the second client authentication.

Figure 3:
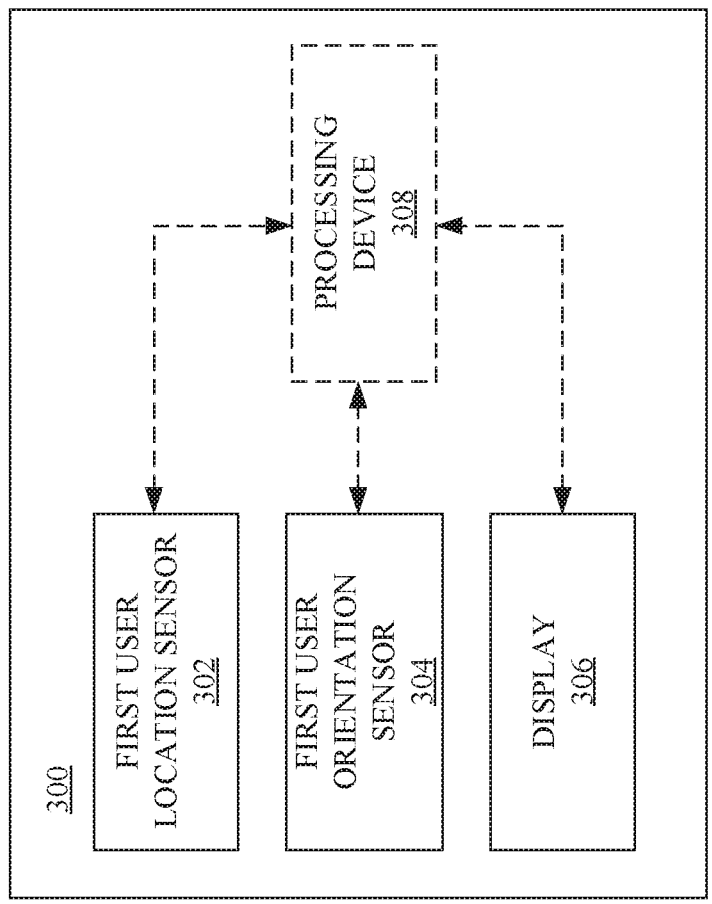
FIG. 3 is a block diagram of a first head mount display for facilitating provisioning of a virtual experience in accordance with some embodiments

FIG. 3 is a block diagram of a first head mount display 300 for facilitating provisioning of a virtual experience in accordance with some embodiments. The first head mount display 300 includes a first user location sensor 302 of the at least one first sensor configured for sensing the first user location and a first user orientation sensor 304 of the at least one first sensor configured for sensing the first user orientation.

Further, the first head mount display 300 may include a display device 306 to present visuals. The display device may a first see-through display device.

Further, the first head mount display 300 may include a processing device 308 configured to obtain sensor data from the first user location sensor 302 and the first user orientation sensor 304. Further, the processing device 308 may be configured to send visuals to the display device 306.

Figure 4:
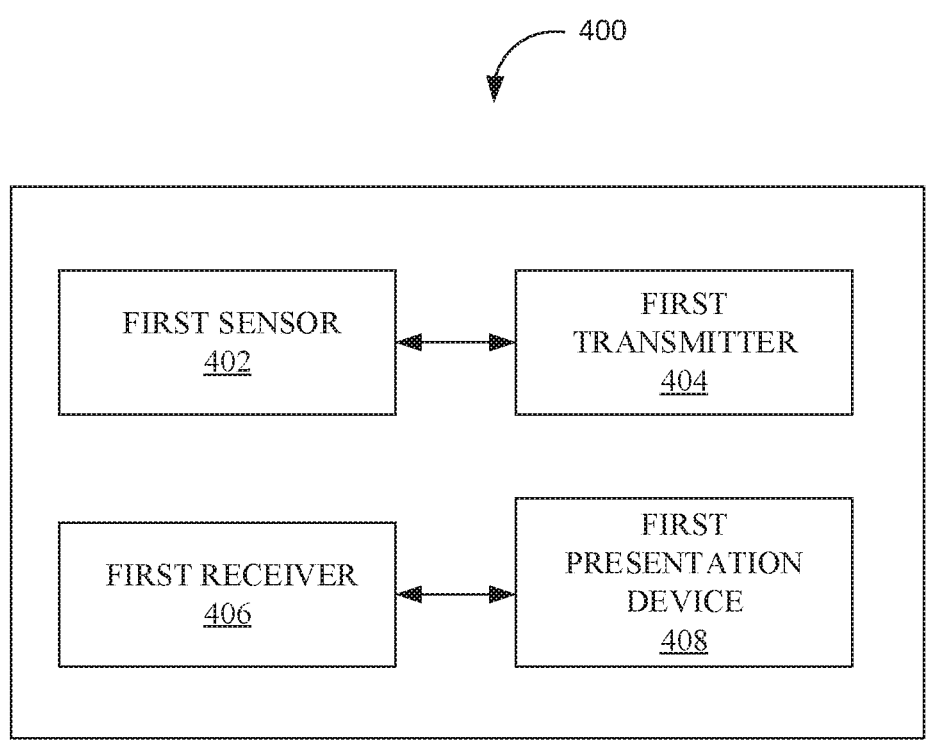
FIG. 4 is a block diagram of an apparatus for facilitating provisioning of a virtual experience in accordance with some embodiments.

FIG. 4 is a block diagram of an apparatus 400 for facilitating provisioning of a virtual experience in accordance with some embodiments. The apparatus 400 may include at least one first sensor 402 (such as the at least one first sensor 210) configured for sensing at least one first sensor data associated with a first vehicle (such as the first vehicle 208). Further, the apparatus 400 may include a first transmitter 404 (such as the first transmitter 212) configured to be communicatively coupled to the at least first sensor 402. Further, the first transmitter 404 may be further configured for transmitting the at least one first sensor data to a communication device (such as the communication device 202) of a system over a first communication channel.

Further, the apparatus 400 may include a first receiver 406 (such as the first receiver 216) configured for receiving the at least one first presentation data from the communication device over the first communication channel.

Further, the apparatus 400 may include at least one first presentation device 408 (such as the at least one first presentation device 214) configured to be communicatively coupled to the first receiver 406. The at least one first presentation device 408 may be configured for presenting the at least one first presentation data.

Further, the communication device may be further configured for receiving at least one second sensor data corresponding to at least one second sensor (such as the at least one second sensor 220) associated with a second vehicle (such as the second vehicle 218). Further, the at least one second sensor may be communicatively coupled to a second transmitter (such as the second transmitter 222) configured for transmitting the at least one second sensor data over a second communication channel. Further, the system further may include a processing device (such as the processing device 204) communicatively coupled to the communication device. Further, the processing device may be configured for generating the at least one first presentation data based on the at least one second sensor data.

Figure 5:
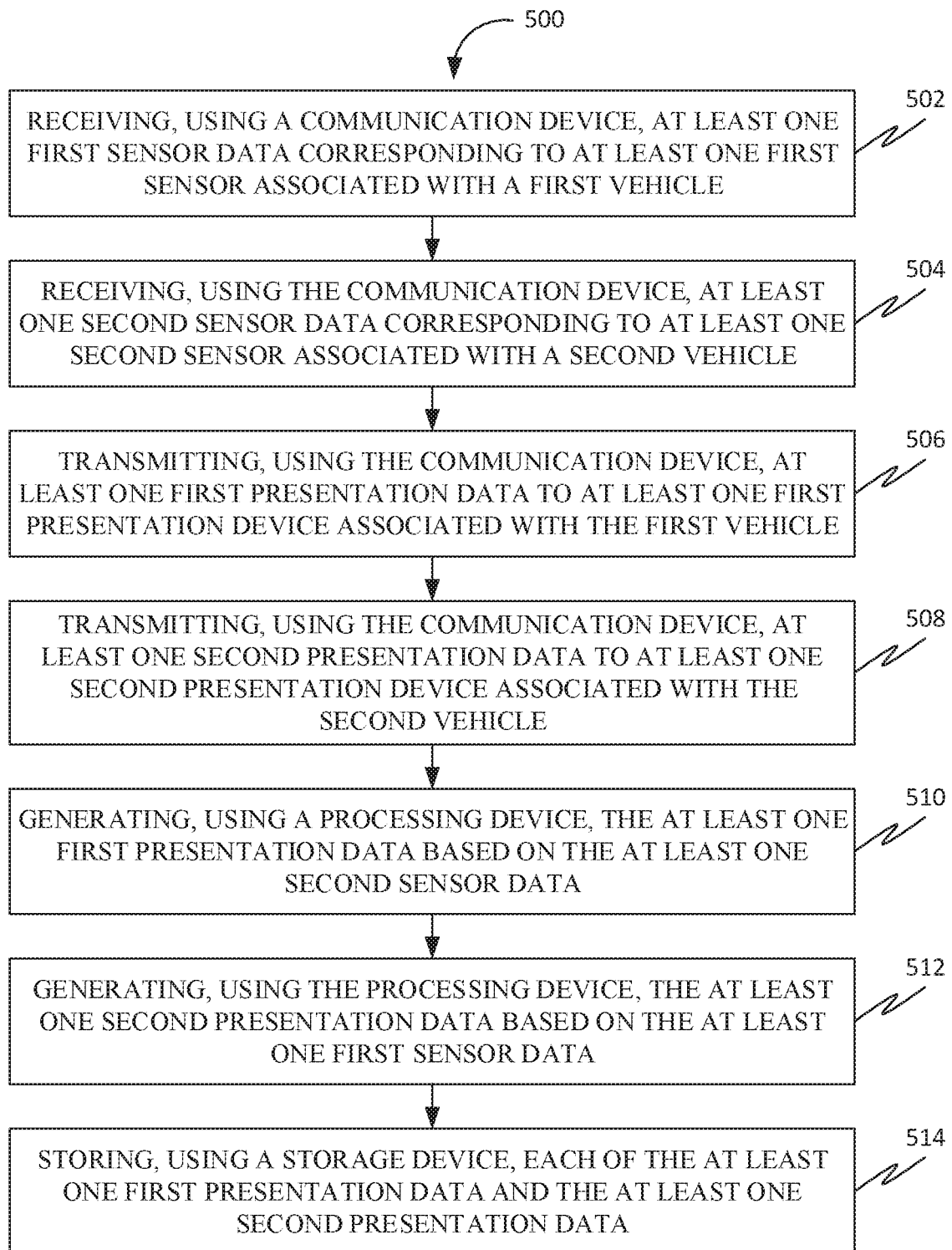
FIG. 5 is a flowchart of a method of facilitating provisioning of a virtual experience in accordance with some embodiments.

FIG. 5 is a flowchart of a method 500 of facilitating provisioning of a virtual experience in accordance with some embodiments. At 502, the method 500 may include receiving, using a communication device (such as the communication device 202), at least one first sensor data corresponding to at least one first sensor (such as the at least one first sensor 210) associated with a first vehicle (such as the first vehicle 208). Further, the at least one first sensor may be communicatively coupled to a first transmitter (such as the first transmitter 212) configured for transmitting the at least one first sensor data over a first communication channel.

At 504, the method 500 may include receiving, using the communication device, at least one second sensor data corresponding to at least one second sensor (such as the at least one second sensor 220) associated with a second vehicle (such as the second vehicle 218). Further, the at least one second sensor may be communicatively coupled to a second transmitter (such as the second transmitter 222) configured for transmitting the at least one second sensor data over a second communication channel.

At 506, the method 500 may include transmitting, using the communication device, at least one first presentation data to at least one first presentation device associated with the first vehicle. Further, the at least one first presentation device may include a first receiver (such as the first receiver 216) configured for receiving the at least one first presentation data over the first communication channel. Further, the at least one presentation device may be configured for presenting the at least one first presentation data.

At 508, the method 500 may include transmitting, using the communication device, at least one second presentation data to at least one second presentation device (such as the at least one second presentation device 224) associated with the second vehicle. Further, the at least one second presentation device may include a second receiver (such as the second receiver 226) configured for receiving the at least one second presentation data over the second communication channel. Further, the at least one presentation device may be configured for presenting the at least one second presentation data.

At 510, the method 500 may include generating, using a processing device (such as the processing device 204), the at least one first presentation data based on the at least one second sensor data.

At 512, the method 500 may include generating, using the processing device, the at least one second presentation data based on the at least one first sensor data.

At 514, the method 500 may include storing, using a storage device (such as the storage device 206), each of the at least one first presentation data and the at least one second presentation data.

Figure 6:
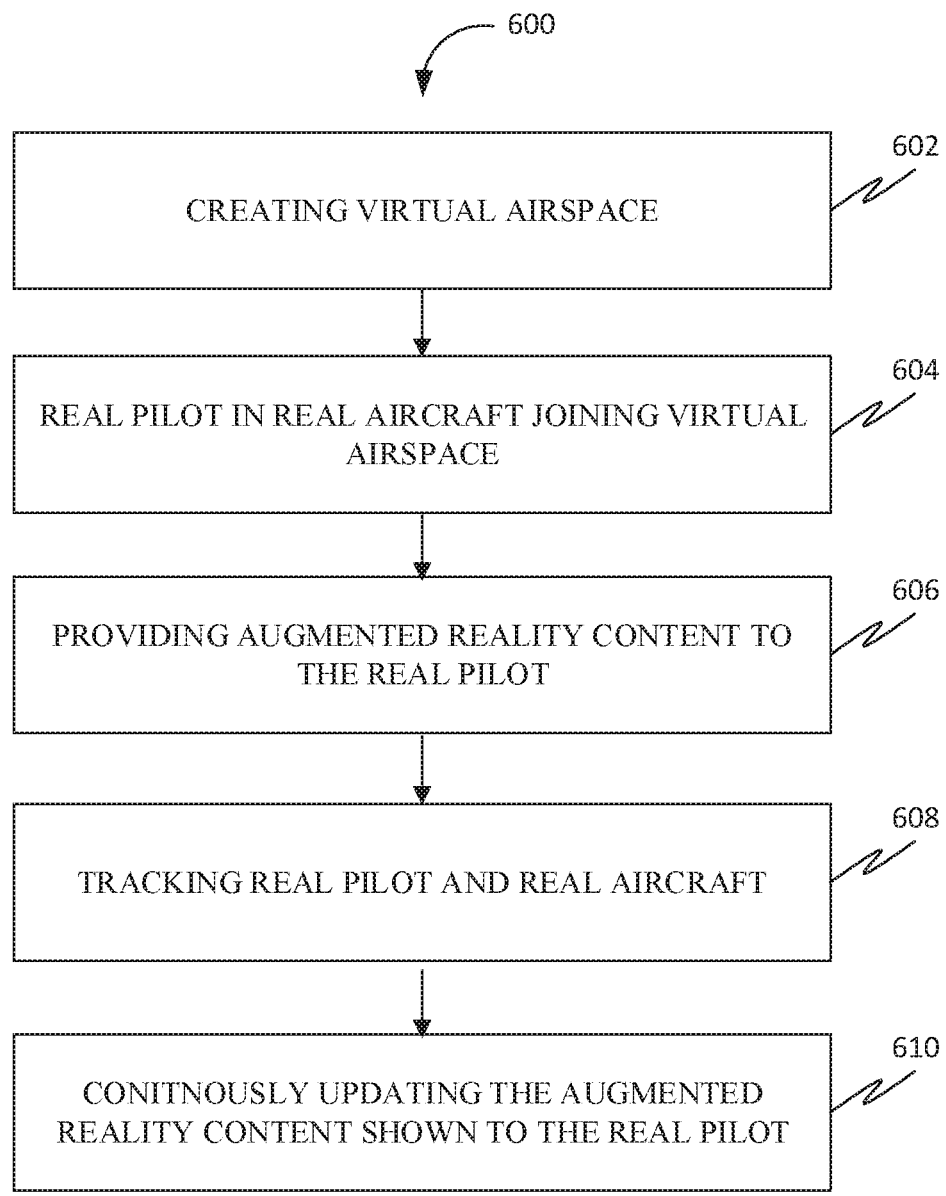
FIG. 6 shows a method to allow real pilots in real aircraft using augmented and virtual reality to meet in a virtual piece of airspace, in accordance with some embodiments.

FIG. 6 shows a method 600 to allow real pilots in real aircraft using augmented and virtual reality to meet in a virtual airspace, in accordance with some embodiments. At 602, the method 600 may include creating the virtual airspace in an augmented and virtual reality environment. The virtual airspace may be a three-dimensional space in which one or more aircraft may meet.

Further, at 604, the method 600 may include a real pilot in a real aircraft joining the virtual airspace via their augmented and virtual reality equipment. The real aircraft may be flying in the real world. Accordingly, an image of the real aircraft may be included in the virtual airspace. Therefore, this provides a live simulation involving real people operating real systems.

In some embodiments, the virtual airspace may include virtual aircraft, which may be flown by real people in simulated systems, on the ground.

In some embodiments, the virtual airspace may further include constructed aircraft (and/or targets). The constructed aircraft may be generated and controlled using computer graphics and processing systems.

Further, at 606, the method 600 may include providing augmented and virtual reality content to the real pilot via their augmented and virtual reality equipment.

In some embodiments, the method may include providing augmented and virtual reality content to the real people (on the ground) flying virtual aircraft in the virtual airspace.

Further, at 608, the method 600 may include tracking the real pilot and the real aircraft. This may include tracking the position and orientation of the pilot's head within the cockpit of the aircraft using the one or more internal sensors. Further, this may include tracking the operational state (e.g. location, speed, the direction of travel, etc.) of the aircraft in the virtual airspace using the one or more external sensors.

Moreover, at 610, the method 600 may include continuously updating the augmented and virtual reality content shown to the real pilot flying the real aircraft based on the tracking the real pilot and the real aircraft.

In some embodiments, the augmented and virtual reality content shown to the real pilot flying the real aircraft may be updated based on the operational state (e.g. location, speed, the direction of travel, etc.) of the virtual aircraft flown by the real people (on the ground) and the operational state (e.g. location, speed, the direction of travel, etc.) of the constructed aircraft.

In some embodiments, the method 600 may include continuously updating the augmented and virtual reality content shown to the real pilot (on the ground) flying the virtual aircraft based on the tracking the real pilot and the real aircraft, the operational state (e.g. location, speed, the direction of travel, etc.) of the virtual aircraft flown by to the real people (on the ground) and the operational state (e.g. location, speed, the direction of travel, etc.) of the constructed aircraft.

Figure 7:
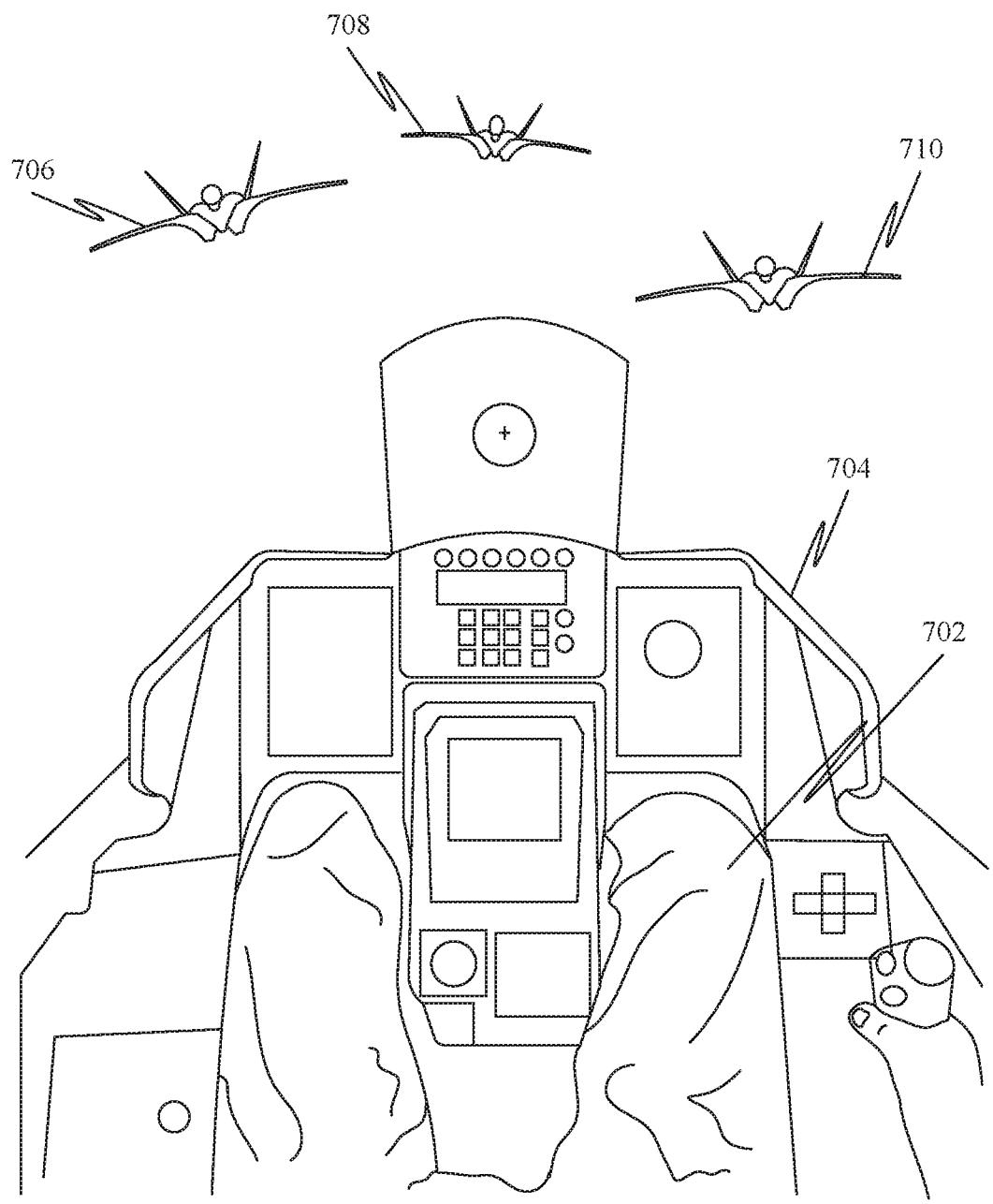
FIG. 7 shows an augmented reality view shown to a real pilot, in accordance with an exemplary embodiment.

FIG. 7 shows the augmented and virtual reality content shown to a real pilot 702 flying a real aircraft 704, in accordance with an exemplary embodiment. The augmented and virtual reality content may include one or more live aircraft 706 (representing real pilots flying real aircraft), one or more virtual aircraft 708 (representing real people on the ground, flying virtual aircraft) and one or more constructed aircraft 710 (representing aircraft generated and controlled using computer graphics and processing systems). Accordingly, the pilot 702 wearing an augmented and virtual reality display device (such as the augmented and virtual reality display device 106) may look out the cockpit window to see enemy aircraft (706, 708, 710) in extremely high fidelity. Further, the pilot 702 may then practice offensive/defensive air-to-air manoeuvres against the digital enemy while continuing to fly his own aircraft 704.

Figure 8:
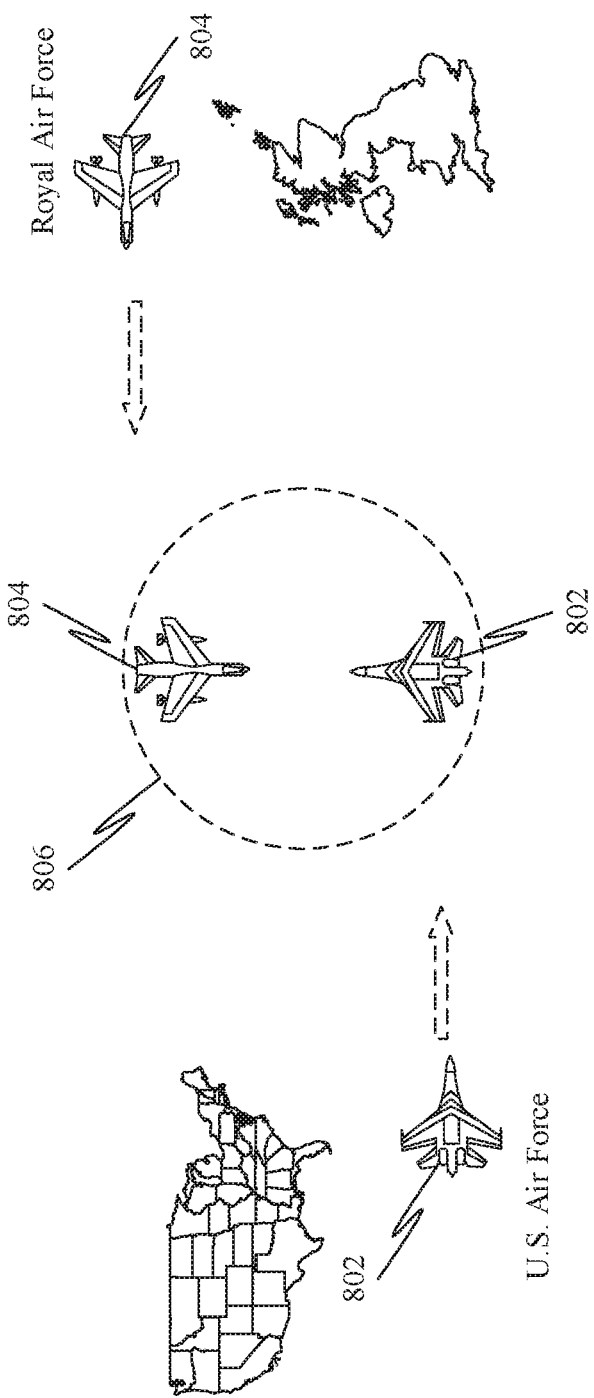
FIG. 8 shows two real aircraft in a virtual airspace, in accordance with an exemplary embodiment.

FIG. 8 shows two real aircraft 802-804 in a virtual airspace 806, in accordance with an exemplary embodiment. The two real aircraft 802-804 may be flown by two real pilots (a pilot A and a pilot B). Further, both pilots may be capable of using the disclosed system to view the augmented and virtual reality content. Further, the pilot A may be able to see the pilot B via their augmented and virtual reality equipment. Further, the pilot A may be able to see one or more virtual aircraft (not shown) which may be enemy aircraft or friendly aircraft. Similarly, the pilot B may be able to see the pilot A via their augmented and virtual reality equipment. Further, the pilot B may be able to see one or more virtual aircraft (not shown) which may be enemy aircraft or friendly aircraft.

In some embodiments, the pilot A and the pilot B may be enemies and may engage in combat against each other.

In some embodiments, the pilot A and the pilot B may be friendly and may cooperate in combat against enemy aircraft. High-speed communication between the two aircraft may be employed to allow for effective cooperation.

In some embodiments, the two aircraft 802-804 may not fly together in the real world. As shown in FIG. 8, the aircraft 802 may be part of the US Air Force and may take off in the USA. Further, the aircraft 804 may be a part of the Royal Air Force and may take off in the UK. Therefore, the two aircraft 802-804 fly physically in different geographical locations, but they may share the same virtual airspace 806 (a 6D airspace) provided by the disclosed system.

Accordingly, the pilot A may fight against the pilot B in the common virtual airspace 806. Therefore, each pilot may see other pilot's virtual image in their augmented and virtual reality equipment.

Further, the pilot A and the pilot B may fight together against enemies. Again, both pilots may see each other's virtual images. However, in this case, they may collaborate, and not fight against each other.

Figure 9:
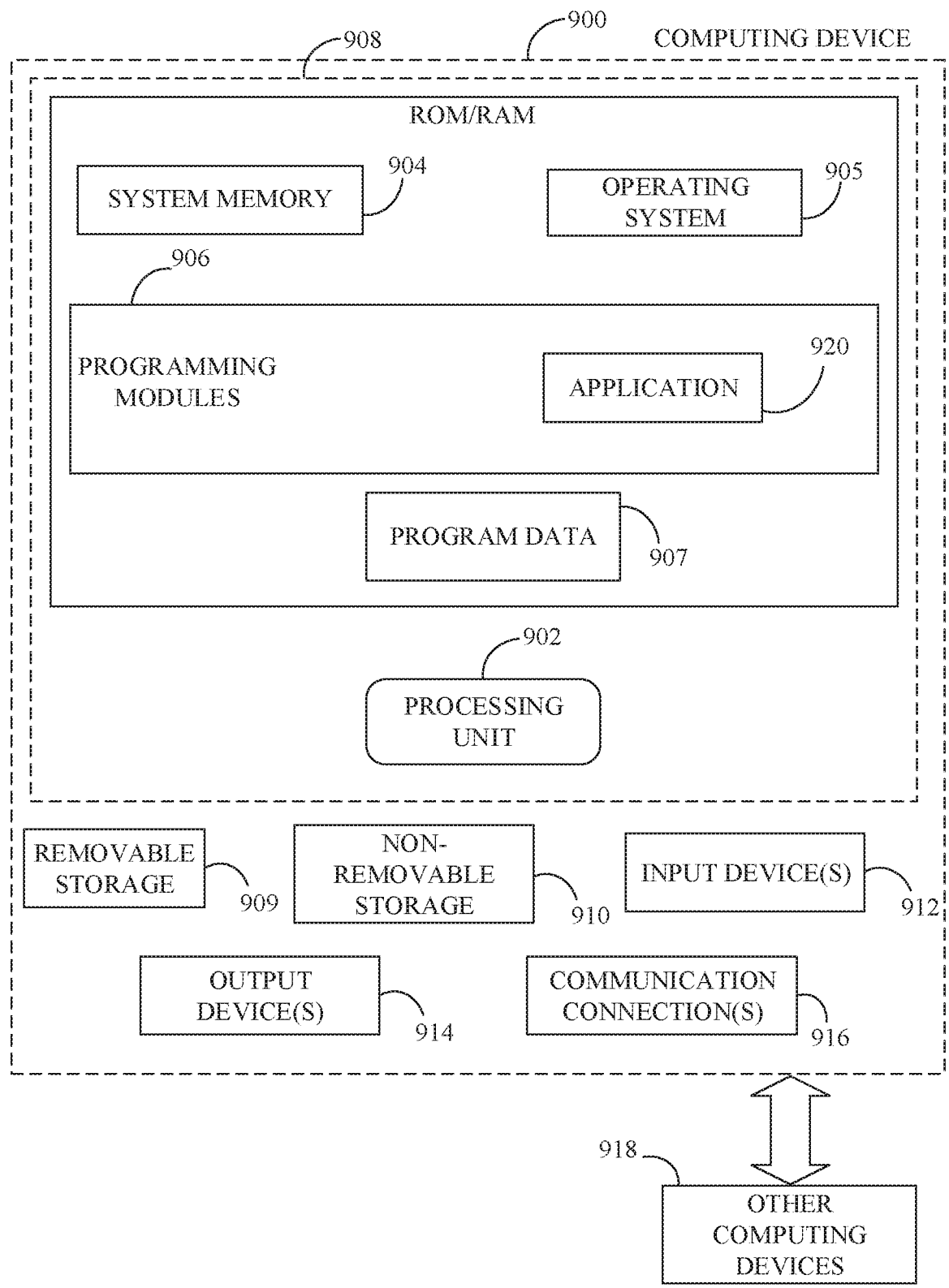
FIG. 9 is a block diagram of a computing device for implementing the methods disclosed herein, in accordance with some embodiments.

With reference to FIG. 9, a system consistent with an embodiment of the disclosure may include a computing device or cloud service, such as computing device 900. In a basic configuration, computing device 900 may include at least one processing unit 902 and a system memory 904. Depending on the configuration and type of computing device, system memory 904 may comprise, but is not limited to, volatile (e.g. random-access memory (RAM)), non-volatile (e.g. read-only memory (ROM)), flash memory, or any combination. System memory 904 may include operating system 905, one or more programming modules 906, and may include a program data 907. Operating system 905, for example, may be suitable for controlling computing device 900's operation. In one embodiment, programming modules 906 may include image-processing module, machine learning module. Furthermore, embodiments of the disclosure may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and non-volatile, removable and non-removable media implemented in any method or technology for storage of information, such as computer-readable instructions, data structures, program modules, or other data. System memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, a location sensor, a camera, a biometric sensor, etc. Output device(s) 914 such as a display, speakers, a printer, etc. may also be included. The aforementioned devices are examples and others may be used.

Computing device 900 may also contain a communication connection 916 that may allow device 900 to communicate with other computing devices 918, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 904, including operating system 905. While executing on processing unit 902, programming modules 906 (e.g., application 920 such as a media player) may perform processes including, for example, one or more stages of methods, algorithms, systems, applications, servers, databases as described above. The aforementioned process is an example, and processing unit 902 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

We claim:

1. A method comprising:
   creating a virtual airspace corresponding to a volume of space, the virtual airspace comprising at least one virtual object having a defined position within the virtual airspace;
   receiving a first sensor data corresponding to at least one first sensor associated with a first vehicle, wherein the at least one first sensor data comprises data indicative of a position of a first vehicle;
   receiving a second sensor data corresponding to at least one second sensor associated with a second vehicle, wherein the at least one second sensor data comprises data indicative of a position of a second vehicle;
   mapping the position of the first vehicle to a virtual first vehicle position in the virtual airspace;
   mapping the position of the second vehicle to a virtual second vehicle position in the virtual airspace;
   generating a first presentation data based, at least in part, on the second sensor data, the virtual second vehicle position and the defined position of the at least one virtual object and transmitting the first presentation data to the first presentation device associated with the first vehicle; and
   generating a second presentation data based, at least in part, on the first sensor data, the virtual first vehicle position and the defined position of the at least one virtual object and transmitting the second presentation data to the second presentation device associated with the second vehicle;
   wherein the virtual airspace comprises a volume of space bounded by defined coordinates and within which at least one of the first vehicle and second vehicle is not located.

2. The method of claim 1, further comprising repeatedly performing the receiving, mapping and generating steps.

3. The method of claim 1, wherein at least one of the position of the first vehicle and the position of the second vehicle is conicident with the virtual first vehicle position and the virtua; second vehicle position, respectively.

4. The method of claim 1, wherein the at least one virtual object is selected from the group consisting of the first vehicle and the second vehicle.

5. The method of claom 1, further comprising transmitting a first authentication data to the first vehicle and a second authentification data to the second vehicle.

6. A method comprising:
   transmitting a first sensor data corresponding to at least one first sensor associated with a first vehicle, wherein at least one first sensor data comprises data indicative of a position of a first vehicle;
   receiving presentation data for display comprising data indicative of a position of a second vehicle and at least one virtual object; and
   displaying the presentation data to an operator of the first vehicle;
   wherein the position of the first vehicle and the position of the second vehicle are mapped to a virtual airspace and wherein the position of the first vehicle with respect to the position of the second vehicle in the real world differs from that of the position of the first vehicle with respect to the position of the second vehicle in the virtual airspace.

7. The method of claim 6, wherein the second vehicle is an aircraft simulator.

8. The method of claim 6, further comprising transmitting a first authentication data with the first sensor data.

9. The method of claim 6, further comprising receiving a second authentication data with the presentation data.

* * * * *